Aug. 31, 1954 F. T. WIMBERLY 2,688,112

ELECTRICAL CIRCUITS

Filed July 1, 1953

INVENTOR
FLOYD T. WIMBERLY
BY [signature]
ATTORNEY

Patented Aug. 31, 1954

2,688,112

UNITED STATES PATENT OFFICE 2,688,112

ELECTRICAL CIRCUITS

Floyd T. Wimberly, Watertown, Mass., assignor to Raytheon Manufacturing Company, Newton, Mass., a corporation of Delaware Application July 1, 1953, Serial No. 365,497

9 Claims. (Cl. 318—28)

Figures 1, 2:
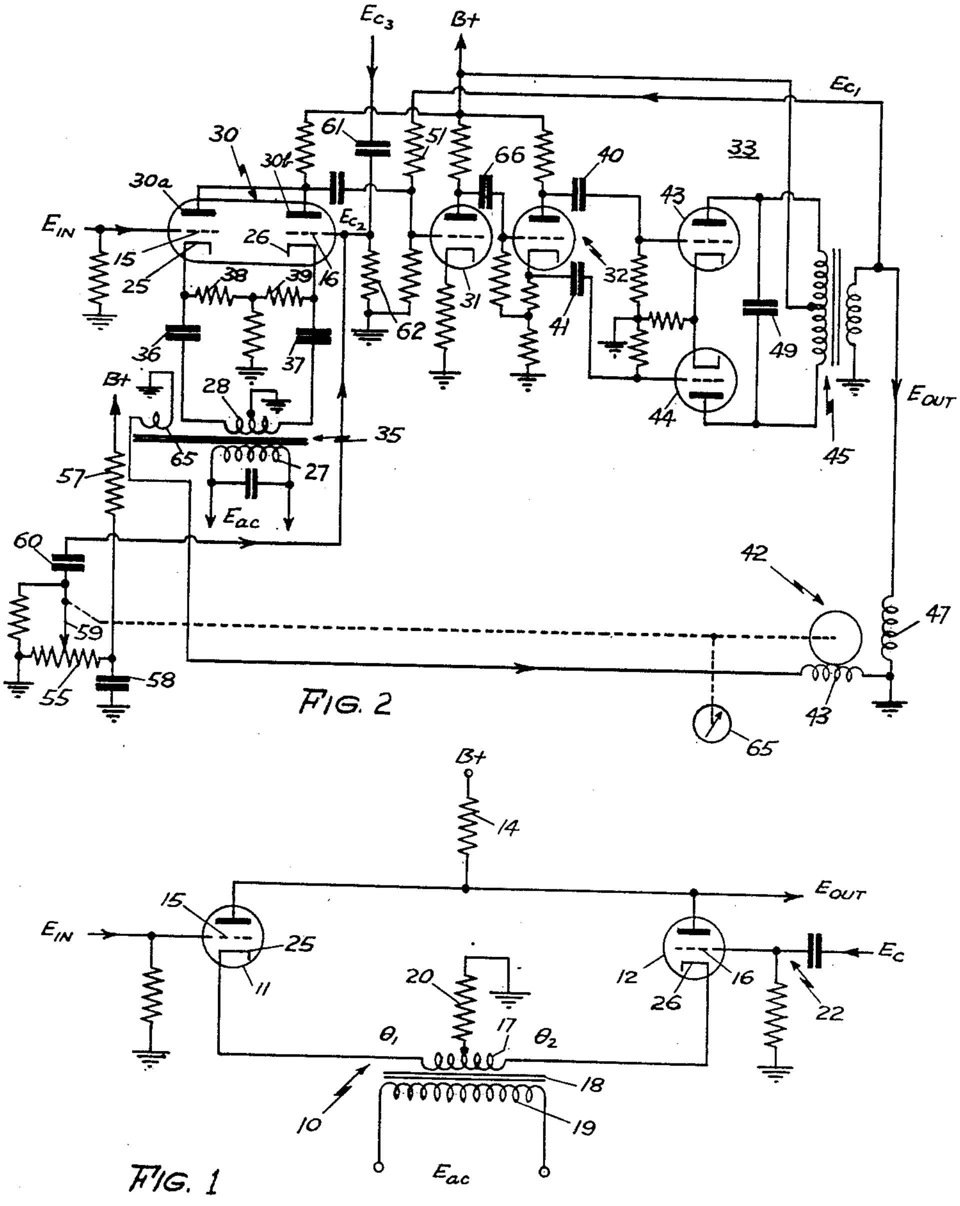

This invention relates to a high gain alternating current servo system of improved stability which is responsive to direct current input signals.

In certain applications, a direct current voltage is obtained which is representative of the magnitude and sense of a variable quantity. It is desirable to convert this direct current voltage into an alternating current control voltage for operation of a servo system which, for example, may drive the movement of an indicating instrument.

Because of the wide range of ambient temperatures over which equipment such as an airborne indicating device is required to operate, bridge rectifiers of the dry contact type, such as crystal or selenium, whose resistance varies with temperature, are unsuitable for use in circuits for conversion from direct current to alternating current. The use of vacuum tube diodes in such circuits results in an unduly large bulk and weight for airborne applications.

To obviate the above-mentioned disadvantages, a switching arrangement has been developed comprising a pair of tubes, each including at least an anode, cathode and a control electrode and arranged with their grid and cathode circuits connected in push-pull and with their anodes connected in parallel. A small alternating current voltage is applied to the two cathodes in push-pull while the variable direct current input control voltage is applied to the grid of one of said tubes. Depending upon the polarity of the direct current input voltage, one or the other tubes conducts more heavily than the other in response to the alternating current excitation applied to the cathode so that an alternating current voltage is derived from the anode circuit whose phase is descriptive of the alternating current voltage applied to the cathode of the more heavily conducting tube. The amplitude of the alternating current output voltage is proportional to the amplitude of the input control voltage.

The switching circuit of the subject invention has several advantages over the diode type circuit normally used for the same purpose. There is no drift in direct current balancing potential with changes in temperature and humidity. Furthermore, if a well-balanced dual triode is used, no balancing control is necessary in the switching device. By using tubes having a control electrode in addition to the cathode and plate, a voltage gain is obtained in the switching tube.

Moreover, the input impedance compared to that of conventional diode switches is high so that the input direct current signals are not loaded down. This high input impedance is particularly useful when operating out of high impedance devices so often encountered in electronic applications.

The grid in the second tube is valuable in that feedback and low frequency dither voltages, necessary to satisfactory operation of the servo system in which the switching circuit is to be used, may be applied thereto without affecting the operation of the circuit.

It is desirable to use servo systems of high gain in order that the servomotor will compensate for very small input error voltages. High gain servo systems, unfortunately, have been accompanied by an inherent instability in the form of hunting or oscillation about a null point.

In order to stabilize the servo system, two feedback loops are employed. One feedback circuit is formed by connecting a portion of the output of the servo amplifier back to the input circuit of said amplifier, thereby reducing the effect of variations in tube characteristics and supply voltages on the servo loop gain.

Another feedback loop is used to reduce the gain of the servo amplifier as a function of the velocity of the servomotor rotation. This causes maximum servo gain in the absence of an error signal, thus permitting the servomotor to develop a high starting torque from a small error signal. This feedback loop reduces the gain of the amplifier by an amount proportional to the speed of a motor as soon as it starts running. In addition, the velocity feedback loop serves to damp out quickly any oscillations that may occur when the motor starts or stops.

To further increase the ability of the servomotor to compensate for very small input error voltages, a small low frequency (dither) voltage is applied to the grid of the tube not receptive of the direct current input voltage. This dither voltage results in continuous oscillation of the motor back and forth so as to reduce static friction in the motor and the associated gear train. This voltage is just large enough in amplitude to take up the gear train backlash and not to move the output indicator system.

A better understanding of this invention may be had by reference to the following description taken in conjunction with the accompanying drawing in which:

Fig. 1 is a schematic diagram of a device for converting a direct current input signal to an alternating current control voltage; and Fig. 2 is a schematic diagram of a servo system utilizing the device of Fig. 1.

Referring to Fig. 1, the direct current to alternating current conversion device utilizes a balanced modulator type circuit 10 consisting of a pair of triodes 11 and 12 which may be enclosed in separate envelopes or may take the form of a dual triode. Triodes 11 and 12 are arranged with their grid and cathode circuits connected in a push-pull manner and with their plates connected in parallel. The plate of each tube is connected to a source of direct current operating potential through a resistor 14. A small alternating current voltage, which is shown, by way of example, as being in the order of magnitude of one volt at 400 cycles per second, is obtained from the secondary 17 of transformer 18. The primary 19 of this transformer may be connected to a standard 115 voltage, 400 cycle source. The common cathode resistor 20 is connected between the center tap on secondary winding 17 and ground. The alternating current voltage is applied to the cathodes 25 and 26 of tubes 11 and 12 in push-pull. The phase at opposite ends of secondary 17 is indicated in Fig. 1 by the letters $\theta_1$ and $\theta_2$, where $\theta_1 - \theta_2 = 180$ degrees. When the modulator is balanced, that is, when both tubes are conducting equally, the 400-cycle alternating current voltage developed in the circuit as a result of the alternating current input applied to the cathode 25 of tube 11 will be cancelled by the alternating current voltage developed in the plate circuit due to the alternating current input applied to the cathode 26 of tube 12 and there will be no modulator output. Because of the common cathode resistor 20, the circuit 10 will be in its balanced condition when the direct current input voltage $E_{IN}$ is zero.

A direct current input voltage $E_{IN}$ whose instantaneous polarity and magnitude are indicative of some changing quantity is applied to the grid 15 of tube 11. Whenever voltage $E_{IN}$ is present at grid 15, the modulator is unbalanced and produces an alternating current output $E_{OUT}$ because the direct current input voltage biases tubes 11 and 12 so that they conduct unequally in response to the alternating current excitation applied to the cathodes.

For example, when the direct current input voltage $E_{IN}$ is positive, tube 11 is made to conduct more heavily than tube 12. This unbalances the modulator and causes an alternating current ripple (control) voltage $E_{OUT}$ to develop in the plate circuit, the predominating phase of which is descriptive of the 400-cycle alternating current voltage impressed on cathode 25 of tube 11. In other words, the 400 cycle per second voltage applied to the cathode of phase $\theta_1$ predominates in the output.

If, on the other hand, $E_{IN}$ is negative, the bias on tube 11 becomes more negative than that on tube 12 and tube 11 conducts less than tube 12. This unbalances the modulator in the other direction and causes an alternating current output control voltage $E_{OUT}$ to be developed in the plate circuit, whose predominating phase is descriptive of the alternating current voltage applied to cathode 26 of tube 12. In other words, phase $\theta_2$ is predominant in the output when $E_{IN}$ is negative. It is thus apparent that the phase of the output voltage is dependent upon the polarity of $E_{IN}$ and that the phase is shifted 180 degrees when the direct current input voltage shifts from positive to negative, or vice versa.

The amplitude of the alternating current voltage $E_{OUT}$ developed in the modulator plate circuit is proportional to the amplitude of the applied direct current input voltage $E_{IN}$ over the linear range of the $e_g - i_p$ characteristic of the particular tube used, that is, up to the point where limiting occurs. Limiting occurs for a positive input voltage when the latter is sufficiently large to drive tube 11 into grid current and for a negative voltage when tube 11 is driven to cutoff.

In addition to the input voltage $E_{IN}$ applied to the grid of tube 11, an additional control voltage or voltages E may be applied to the grid 16 of tube 12 through an appropriate RC coupling network 22 whenever it is desired to utilize modulator 10 in a servo system. Such a servo system is shown in Fig. 2 and includes a balanced modulator 30 (which may be similar to or identical with the balanced modulator 10 of Fig. 1), an amplifier 31, a phase inverter 32, a push-pull output amplifier 33 and a servomotor 42, to which an indicating instrument 65 may be mechanically connected. The direct current input control voltage $E_{IN}$ is applied to grid 15 of section 30a of dual triode 30.

An alternating current voltage $E_{ac}$ is applied to the primary 27 of a transformer 35. The terminals of a first secondary winding 28 of transformer 35 are connected to the cathodes 25 and 26 of tube 30, as shown in Fig. 2.

One winding 43 of two-phase servomotor 42 is continuously excited from a second secondary winding 65 on transformer 35. The phase of the A.-C. voltages applied to the modulator cathodes is shifted ninety degrees by capacitors 36 and 37 and resistors 38 and 39. Therefore, the A.-C. voltage developed in the modulator plate circuit will be either ninety degrees or 270 degrees out of phase with respect to the motor excitation, depending on the error signal polarity. The A.-C. voltage developed in the modulator plate circuit is amplified by resistance-coupled amplifier stage 31 and then fed through capacitor 66 to the grid of inverter tube 32. Tube 32 has its plate load resistance divided equally between the plate and cathode circuits and is used as a split-load phase inverter, producing two output voltages that are equal in amplitude and opposite in phase. Such inverters are well known in the art and need not be described in detail. The two outputs of tube 32 are fed through capacitors 40 and 41 to the grids of push-pull output amplifiers 43 and 44. The output of tubes 43 and 44 is fed through servo output transformer 45 to the control winding 47 of servomotor 42. The primary of transformer 45 is resonated at 400 cycles by capacitor 49 to increase the effective gain of the amplifier. The voltage applied to the control winding 47 of motor 42 will be either ninety degrees or 270 degrees out of phase with respect to the voltage applied to the excitation winding (depending on the polarity of the error signal) and will cause the servomotor to run.

The servo system has been set up so that the A.-C. voltage produced by a positive error signal $E_{IN}$ will cause the motor to run in the direction that decreases the indicated magnitude of the quantity being measured and a negative error signal $E_{IN}$ will cause the motor to run in the direction that produces an increase in the indicated magnitude of said quantity.

In order to make the servo system dead-space as small as possible, that is, make the servomotor compensate for very small altitude errors, it is necessary to use a high gain servo system. In general, however, simple high gain servo systems are inherently unstable in that they tend to oscillate about a null point rather than actually coming to rest. Therefore, two degenerative feedback loops are included around the servo amplifier to increase its stability to the point where the desired high gain can be used without causing oscillation.

One of these feedback loops is used simply to stabilize the gain of the amplifier, preventing it from changing with variations in tube characteristics and supply voltages. This loop is formed by connecting a portion $E_{c1}$ of the output of servo output transformer 45 back to the grid of amplifier 31 through resistor 51.

The other feedback loop is a velocity feedback loop which is used to reduce the gain of the amplifier in proportion to the rate of servo system rotation. This causes maximum servo amplifier gain to be available when there is no error signal, permitting the motor to develop a high starting torque from a small error signal. It then reduces the gain of the amplifier by an amount that is proportional to the speed of the motor as soon as the motor starts running. In addition, it also serves to damp out quickly any oscillations that may occur when the motor starts and stops. This velocity feedback is obtained from servo potentiometer 55 as follows:

Potentiometer 55 is connected across the positive output of a power supply through a decoupling filter consisting of resistor 57 and capacitor 58. The arm 59 of potentiometer 55 is mechanically connected to the shaft of servomotor 42; arm 59 is moved by an amount proportional to the movement of said motor which, in turn, is a function of the magnitude of the alternating current output control voltage $E_{OUT}$. A capacitor 60 prevents the direct current voltage developed at the arm of potentiometer 55 from being applied to the grid 16 of section 30b. The voltage across the active portion of potentiometer 55 is a varying voltage which is proportional to position; this positional voltage must be differentiated in order to produce a voltage representative of motor velocity. The positional voltage is differentiated by means of capacitor 61 and resistor 62 and the resulting velocity feedback control voltage $E_{c2}$ is applied to the grid 16 of section 30b. This voltage is proportional in amplitude and polarity to the speed and direction of servomotor rotation. The polarity of voltage $E_{c2}$ is such that it reduces the voltage output of the modulator, thereby in effect reducing the gain of the servo amplifier as a function of servo speed.

To decrease further the servo dead-space, a small amount of dither voltage $E_{c3}$, whose frequency is of the order of ten cycles per second, is applied to the grid of section 30b through capacitor 61. This dither voltage causes the motor to continuously hunt, thereby reducing static friction in the motor and associated gearing without, at the same time, causing movement of the indicator system.

This invention is not limited to the specific embodiments herein illustrated and described but includes such modifications thereof as fall within the scope of the claims.

For example, in the arrangement shown in Fig. 1 there need be no signal fed to the grid 16, while in the embodiment of Fig. 2, any of the control voltages $E_{c1}$, $E_{c2}$ or $E_{c3}$ may be eliminated. Furthermore, amplifiers 31 and 33 and phase inverter 32 are not necessarily limited to the type shown in Fig. 2. Finally, the frequency of the alternating current voltages $E_{ac}$ and control (dither) voltage $E_{c3}$ need not be 400 cycles per second and ten cycles per second, respectively, as indicated in the above description.

What is claimed is:

1. In combination, circuit means including first and second electron discharge devices each having an anode, cathode and a control electrode, means for applying to said cathodes equal alternating current reference voltages which are 180 degrees out of phase, said anodes of said discharge devices being connected in parallel and forming a portion of an output circuit, said circuit means responsive to the application of a direct current input control signal to the control electrode of said first discharge device for deriving an alternating current output control voltage in said output circuit whose phase and magnitude are representative of the polarity and magnitude, respectively, of said input signal.

2. In combination, first and second current controlling electron discharge devices each having an anode, a cathode and a control electrode, an alternating current reference voltage applied to said cathodes in phase opposition, means responsive to the application of a direct current input control signal to the control electrode of one of said electron discharge devices for deriving an alternating current output control voltage whose phase and magnitude are representative of the polarity and magnitude, respectively, of said direct current input signal.

3. In combination, first and second current controlling electron discharge devices each having an anode, a cathode and a control electrode, said discharge devices each normally biased to conduct equally in the absence of signals applied to said control electrodes, an alternating current reference voltage applied to said cathodes in phase opposition, means responsive to the application of a direct current input control signal to the control electrode of one of said electron discharge devices for deriving an alternating current output control voltage whose phase and magnitude are representative of the polarity and magnitude, respectively, of said direct current input signal.

4. In combination, first and second current controlling electron discharge devices each having an anode, a cathode and a control electrode, said discharge devices each normally biased to conduct equally in the absence of signals applied to said control electrodes, an alternating current reference voltage applied to said cathodes in phase opposition, means responsive to the application of a direct current input control signal to the control electrode of one of said electron discharge devices for deriving an alternating current output control voltage whose phase is indicative of the polarity of said direct current input signal.

5. In combination, first and second electron discharge devices each having an anode, cathode and a control electrode, means for applying an alternating current reference voltage to said cathodes in phase opposition, said anodes of said discharge devices being connected in parallel and forming a portion of an output circuit, means responsive to the application of a direct current input control signal to the control electrode of said first discharge device for deriving an alternating current output control voltage in said output circuit whose phase and magnitude are representative of the polarity and magnitude, respectively, of said input signal.

6. In combination, circuit means including first and second electron discharge devices each having an anode, cathode and a control electrode, means for applying an alternating current reference voltage to said cathodes in phase opposition, said anodes of said discharge devices being connected in parallel and forming a portion of an output circuit, said circuit means responsive to the application of a first direct current input control signal to the control electrode of said first discharge device for deriving an alternating current output control voltage in said output circuit whose phase and magnitude are representative of the polarity and magnitude, respectively, of said input signal, said circuit means further responsive to the application of a second direct current input control signal to the control electrode of said second discharge device for reducing the gain of said circuit means in accordance with some desired function.

7. In combination, first and second current controlling electron discharge devices each having an anode, a cathode and a control electrode, said discharge devices each normally biased to conduct equally in the absence of signals applied to said control electrodes, an alternating current reference voltage applied to said cathodes in phase opposition, means responsive to the application of a direct current input control signal to the control electrode of one of said electron discharge devices for deriving an alternating current output control voltage whose polarity and magnitude are representative of the phase and magnitude, respectively, of said direct current input signal, a servomotor rotatable in response to said alternating current output control voltage and to said alternating current reference voltage, means including a potentiometer whose movable arm is driven by said servo motor for deriving a velocity feedback voltage which is proportional in amplitude and polarity to the speed and direction of rotation of said servo motor, and means for applying said velocity feedback voltage to the grid circuit of the other of said electron discharge devices to reduce the alternating current output control voltage in accordance with the rate of rotation of said servomotor.

8. In combination, first and second current controlling electron discharge devices each having an anode, a cathode and a control electrode, said discharge devices each normally biased to conduct equally in the absence of signals applied to said control electrodes, an alternating current reference voltage applied to said cathodes in phase opposition, means responsive to the application of a direct current input control signal to the control electrode of one of said electron discharge devices for deriving an alternating current output control voltage whose phase and magnitude are representative of the polarity and magnitude, respectively, of said direct current input signal, a servomotor rotatable in response to said alternating current output voltage and to said alternating current reference voltage, means including a potentiometer whose movable arm is driven by said servomotor for deriving a velocity feedback voltage which is proportional in amplitude and polarity to the speed and direction of rotation of said servomotor, means for applying said velocity feedback voltage to the grid circuit of the other of said electron discharge devices to reduce the alternating current output control voltage in accordance with the rate of rotation of said servomotor, and means for applying a dither voltage of low frequency and amplitude to the grid circuit of said other electron discharge device to overcome the static friction in said servomotor.

9. In combination, circuit means including first and second current controlling electron discharge devices each having an anode, a cathode and a control electrode, means for applying to said cathodes equal alternating current reference voltages which are 180 degrees out of phase, said circuit means responsive to the application of a direct current input control signal to the control electrode of one of said electron discharge devices for deriving an alternating current output control voltage whose phase and magnitude are representative of the polarity and magnitude, respectively, of said direct current input signal, a servomotor rotatable in response to said alternating current output voltage and to said alternating current reference voltages, means including a potentiometer whose movable arm is driven by said servomotor for deriving a velocity feedback voltage which is proportional to the rate of rotation of said servomotor, and means for applying said velocity feedback voltage to the grid circuit of the other of said electron discharge devices to reduce the alternating current output control voltage in accordance with said rate of rotation.

References Cited in the file of this patent

UNITED STATES PATENTS

| Number | Name | Date |
|---|---|---|
| 1,939,455 | Livingston | Dec. 12, 1933 |
| 2,276,752 | Willis | Dec. 17, 1942 |
| 2,429,755 | Hallmark | Oct. 28, 1947 |
| 2,473,457 | Tyson | June 14, 1949 |
| 2,492,863 | Hays, Jr. | Dec. 27, 1949 |
| 2,545,223 | Briggs | Mar. 13, 1951 |
| 2,627,057 | Rogers | Jan. 27, 1953 |